No. 781,425. Patented January 31, 1905.

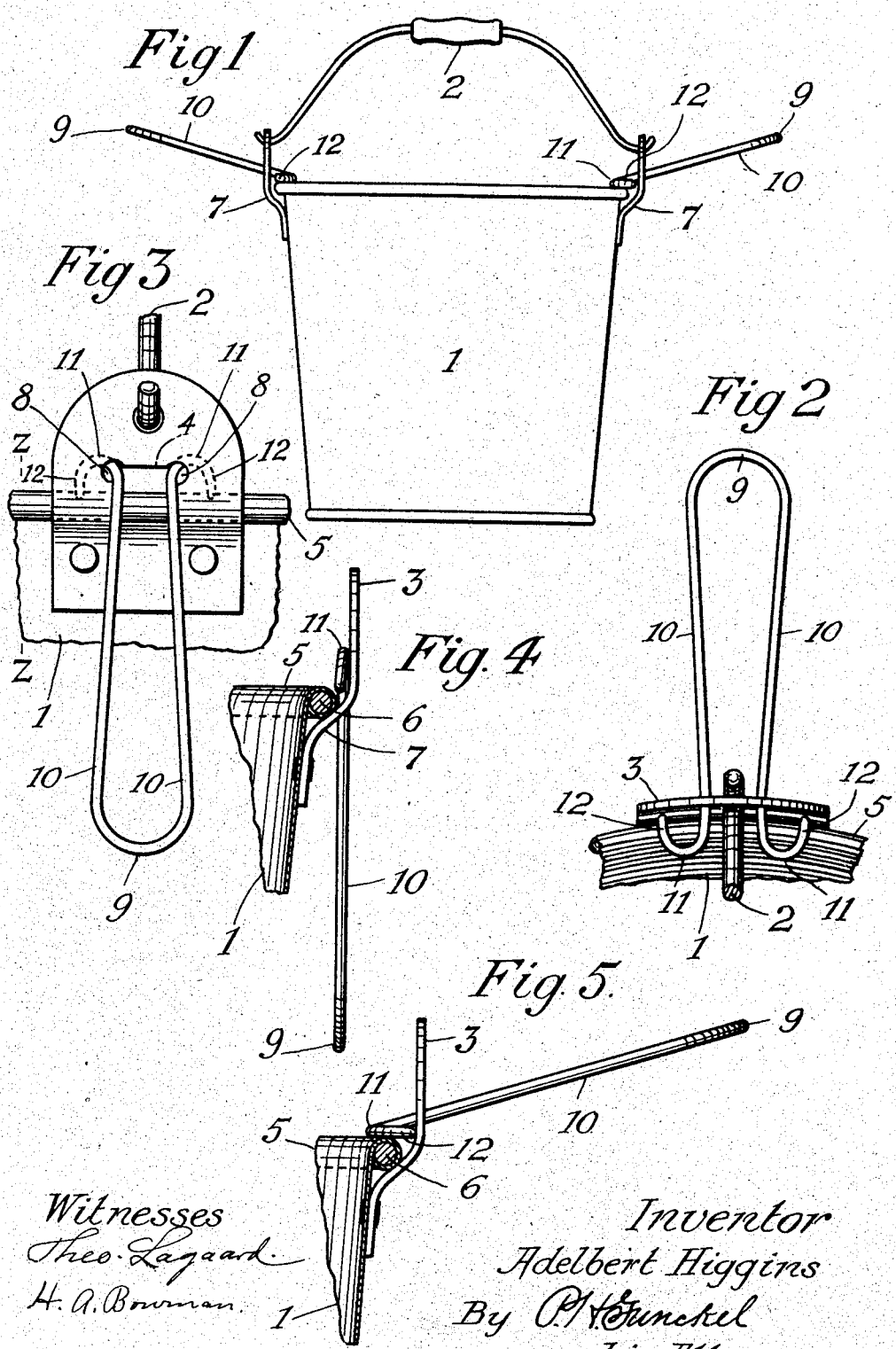

UNITED STATES PATENT OFFICE.

ADELBERT HIGGINS, OF MINNEAPOLIS, MINNESOTA.

MILK-PAIL SUPPORTER.

SPECIFICATION forming part of Letters Patent No. 781,425, dated January 31, 1905.

Application filed May 2, 1904. Serial No. 205,985.

*To all whom it may concern:*

Be it known that I, ADELBERT HIGGINS, a citizen of the United States, residing at Minneapolis, county of Hennepin, and State of Minnesota, have invented certain new and useful Improvements in Milk-Pail Supporters, of which the following is a specification.

My invention relates to supporters for pails for use in milking; and its object is to provide simple and convenient devices attached to the pail by means of which it can be supported between the knees of the person while milking.

My improvement, stated in a general way, comprises suitably-slotted ears attached to the pail and adjustable supporters formed of wires bent into suitable shapes and preferably having a tendency to spread their ends apart and adapted to be inserted in or removed from the slots in the ears and to engage the top of the pail and upper walls of the ear-slots when lifted to substantially horizontal positions for supporting the pail, and when not in use the supporters are so arranged as to gravitate to the sides of the pail.

The devices of my improvement are illustrated in the accompanying drawings, in which—

Figure 1 is a side elevation of a pail equipped with my improved supporters. Fig. 2 is a top view of a side portion of the pail, showing one of the supporters in operative position. Fig. 3 is a side elevation of a similar portion of the pail, showing the supporter in inoperative or depending position. Fig. 4 is a sectional view of the pail on the line *z z* of Fig. 3 and shows the ear and supporter in side elevation; and Fig. 5 is a view similar to Fig. 4, but showing the supporter in operative position.

In the drawings, 1 designates an ordinary pail, 2 its bail, and 3 the ears, to which the bail is connected in the ordinary way. In the present instance I have shown the ears 3 as being utilized for the double purpose of attaching the bail and connecting the supporters; but obviously separate ears may be employed for the latter purpose, and thereby my improvements can be applied to pails after they have been constructed in the usual way.

The ears have openings 4 in their middle portions on a plane with the top 5 of the pail, the top margin of the tin of the pail being bent around a circular stiffening-wire 6 in the customary way. The ears are offset or bent outward suitably, as shown at 7, to permit the supporters to hang close to the sides of the pail, as indicated in Fig. 4. It is also desirable to form shallow recesses 8 of curved shape in the upper corners of the openings 4 to receive the opposite branches of the supporters and prevent them from gravitating when not desired from their horizontal positions.

The supporters are composed each of a single piece of stiff and somewhat springy wire bent at its middle 9 to approximately semicircular shape, this bent portion tending to spring the other ends of the branches 10 farther apart than the width of the ear-slots 4. The end portions of the wire are bent outward and backward, as at 11, and the extreme ends slightly downward, as at 12, so that when the ends are inserted in the openings 4 and the supporters are raised to their limits the ends 12 will bear upon the pail-top 5 and the parts of the branches adjacent to the looped portions 11 will bear against the upper walls of the openings 4. The supporter can be inserted or removed from the slot by pressing together its inner ends and turning it toward one side of the ear, which will permit one and then the other hooked portion to be passed through the opening. To change it from operative or horizontal to inoperative or pendent position, it is only necessary to press the ends inward sufficiently to free them from the recesses 8 and then allow it to gravitate.

Having described my invention, what I claim, and desire to secure by Letters Patent, is—

1. The combination with a pail, of ears having central openings on the plane of the pail-top, and pail-supporters having body portions extending outward through said openings in the ears and consisting of wires bowed at the middle and having a tendency to spread laterally and having their end portions bent into loops toward the right and left, respectively, to form bearings, substantially as set forth.

2. The combination with a pail, of ears having central openings on the plane of the pail-top, the upper portion of the opening being laterally recessed, and pail-supporters having body portions extending outward through said openings in the ears and consisting of wires bowed at the middle and having a tendency to spread laterally and having their end portions bent into loops toward the right and left, respectively, to form bearings, substantially as set forth.

In testimony whereof I have signed my name to this specification, in the presence of two subscribing witnesses, this 26th day of April, 1904.

ADELBERT HIGGINS.

Witnesses:
P. H. GUNCKEL,
H. A. BOWMAN.